May 30, 1933.  J. B. JOHNSON  1,912,146
GLOW DISCHARGE DEVICE
Filed March 25, 1929   2 Sheets-Sheet 1

INVENTOR
J. B. JOHNSON
BY
Walter C. Kiesel
ATTORNEY

May 30, 1933.  J. B. JOHNSON  1,912,146
GLOW DISCHARGE DEVICE
Filed March 25, 1929   2 Sheets-Sheet 2
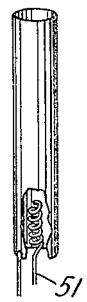
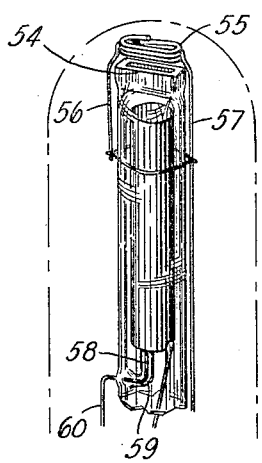
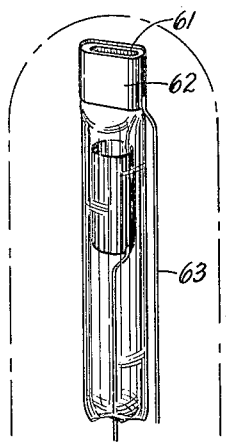
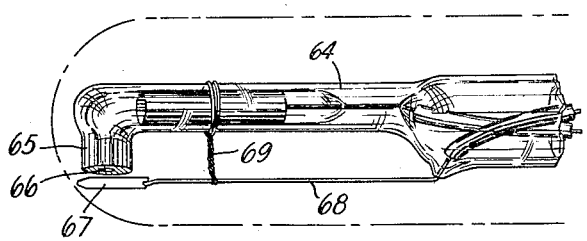
INVENTOR
J. B. JOHNSON
BY
Walter C. Kiesel
ATTORNEY Patented May 30, 1933

1,912,146

UNITED STATES PATENT OFFICE

JOHN B. JOHNSON, OF MILLBURN, NEW JERSEY, ASSIGNOR TO BELL TELEPHONE LABORATORIES, INCORPORATED, OF NEW YORK, N. Y., A CORPORATION OF NEW YORK

GLOW DISCHARGE DEVICE

Application filed March 25, 1929. Serial No. 349,628.

This invention relates to glow discharge devices in which a gas or mixture of gases forms the light conducting medium.

An object of the invention is to intensify the source of light in a gaseous discharge device without the disadvantages of short operating life and decreasing actinic properies of the glow discharge.

In accordance with a broad aspect of the invention, the discharge device comprises an enclosing vessel containing two metallic electrodes immersed in a gaseous atmosphere, such as a mixture of monatomic and diatomic gases, and in which the cathode is segregated from the anode by an inner enclosing vessel or chamber provided with a short column having a constricted passageway or capillary, so that the highly intensive luminescent discharge between the electrodes is concentrated in the short capillary. The constricted column is located between the anode and the cathode, so that the glow takes place in the positive portion of the discharge. By constricting the glow within a short column or tube of small diameter the intrinsic brilliance of the positive column can be increased tremendously.

In a specific embodiment of the invention the discharge device comprises a glass vessel having a stem supporting a hollow tubular cathode chamber or inner vessel of insulating material in which a hollow, preferably cylindrical metallic cold electrode or cathode is arranged with its axis coaxial with the inner and outer enclosing vessels. The free end of the hollow tubular vessel is provided with a capillary tube portion or central constricted opening of relatively small area compared with the cross-sectional area of the cylindrical cathode. This opening is also made relatively short to form a column so that an intensive glow discharge takes place between the cathode and an anode located outside the constricted column. The discharge between the electrodes is produced in a gaseous atmosphere comprising a filling of an inert monatomic gas, such as helium, neon or argon at a low pressure, or a mixture of the monatomic gas and a small quantity of an easily ionizable diatomic gas, such as nitrogen, hydrogen or oxygen. With this construction an intensive glow discharge in the constricted column, which is highly efficient in actinic value and brilliance, is formed in a region of increased field intensity and a glow is developed toward the blue portion of the spectrum, thereby increasing its value in photographic recording.

A feature of the invention relates to the shape of the anode adjacent the constricted column in order to permit the glow discharge to be projected toward the end portion of the enclosing vessel. The anode comprises a hollow metallic member, preferably a short cylinder supported by wires clamped to the exterior of the hollow cathode chamber. The cylindrical anode may be provided with a flange or disc secured to one of its ends, one side of the disc being closely positioned over the constricted column in the cathode chamber. These arrangements provide a shielding effect by preventing the negative charge upon the glass wall of the enclosing vessel from diminishing the field strength between the cathode and anode, thereby reducing the break-down voltage between the electrodes.

The assembly of the electrodes in a direct line in which they surround a common axis facilitates the operation of the device so that the source of light can readily be projected on a film or similar recording strip.

In another embodiment of the invention the anode may be formed into a closely wound wire helix to provide a hollow electrode having the directive and shielding properties of the metallic cylindrical anode.

Another feature of the invention relates to initiating the discharge between the main electrodes by means of an internal member or auxiliary anode. This is accomplished by sealing a leading-in wire through the side wall of the tubular cathode chamber adjacent the lower end of the cathode and supporting the auxiliary electrode within the cathode. This electrode may take the form of a solid rod, a hollow cylinder of small diameter or preferably a straight wire. The end of the electrode projecting from a cathode is preferably insulated to prevent voltage breakdown between the leading-in wire and the other electrodes. In this arrangement the starting voltage is materially reduced since the initial discharge readily takes place between the cathode proper and the auxiliary anode and once the auxiliary discharge is started, the main discharge path is easily bridged by the ordinary potential impressed between the cathode and the main anode. When the main discharge path is ionized the auxiliary anode ceases to function, since the only purpose of this electrode is to facilitate the starting of the discharge.

These and other features of the invention will be clearly understood from the following detailed description in connection with the accompanying drawings in which:

Fig. 6 shows a modified form of an auxiliary electrode within the cylindrical electrode;

Fig. 7 shows an arrangement similar to Fig. 6 except that the cylindrical electrode is tapered at one end;

Fig. 8 illustrates a modified form of the invention in which the inner vessel is collapsed at one end to form a narrow slot;

Fig. 9 is a partial view of an assembly similar to Fig. 8 except that the external electrode embraces the collapsed portion of the inner vessel; and Fig. 10 illustrates another form of the invention in which the constricted portion of the inner vessel is at right angles to the axis of the internal electrode and the external electrode is in the form of a flat plate.

Figure 1:
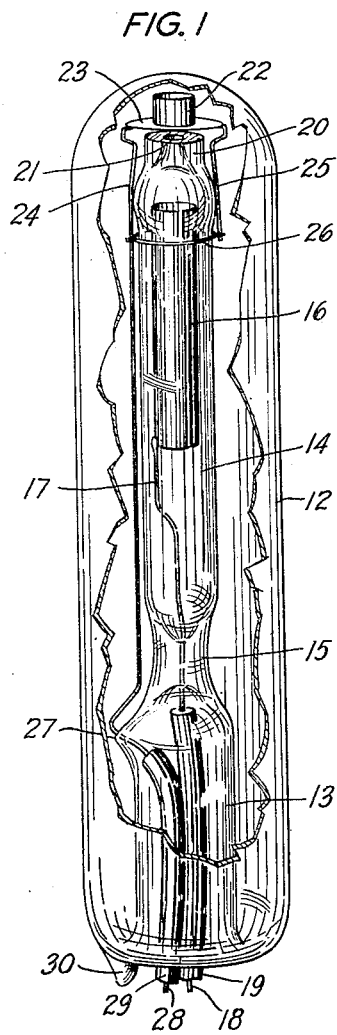
Fig. 1 is a perspective view of the glow discharge device made in accordance with this invention with a portion of the glass vessel broken away to show the relationship of the electrodes and the inner vessel.

Referring to the drawings, Fig. 1 shows the complete assembly of a glow discharge device embodying the essential features of the invention for producing an intensive source of light to be employed in photographic recording. The discharge device comprises an elongated enclosing vessel 12 of glass having an inwardly projecting stem 13 terminating in a hollow inner vessel or chamber 14 of insulating material and preferably formed of material similar to the outer enclosing vessel 12. A sealed press portion 15 is located between the inner chamber 14 and the stem 13 to prevent the access of air into the outer enclosing vessel 12 through the inner chamber. The inner vessel or chamber 14 is preferably cylindrical in form and is coaxially arranged with respect to the circumference of the outer enclosing vessel. A cylindrical metallic cold electrode 16 is enclosed in and contacts with the inner chamber 14 and is preferably formed of a metallic substance, such as nickel which has been thoroughly denuded of gas. This electrode forms the large surface cathode of the device and is preferably supported within the chamber by a leading-in wire 17 which is sealed in the press portion 15 and is provided with a portion 18 extending through the stem 13. The portion 18 located within the stem 13 is provided with a short length of insulating tubing 19 to prevent contact with other wires located in the glass stem. The free end of the inner tubular enclosing vessel 14 is provided with a constricted portion 20 to form a central opening 21 into a short capillary tube or column of relatively smaller diameter than the diameter of the cylindrical cathode within the inner vessel 16. A hollow anode 22, preferably in the form of a cylinder of nickel or other metallic material, is coaxially supported on a perforated disc 23 in alignment with the constricted column in the inner vessel 14 and the hollow cathode 16. The disc 23 may be supported by wires 24 and 25 extending on opposite sides of the inner vessel 14 and attached thereto by the binding wire 26. The wire 24 is preferably extended downwardly to the sealing point 27 on the stem 13 and a portion of the wire 28 extends through the stem and is covered with insulating tubing 29.

The assembly of the electrodes and the position of the constriction at the end of the inner vessel 14 causes an intensive concentrated glow to be produced in the positive column, which acts as a source of light of high brilliance. In order to permit the luminous discharge between the electrodes a conducting medium fills the space in the vessel. In accordance with this invention the conducting medium comprises a filling of a monatomic gas at a low pressure after the enclosing vessel has been thoroughly exhausted of air. The gas fillling preferably consists of helium, although neon or argon may be used with equal advantage. While this gaseous filling is inert and forms a satisfactory medium for the conduction of current between the electrodes, it has been found that a small percentage of an impurity, such as a diatomic gas, causes the discharge to yield an active photographic light of high intensity. This small quantity of easily ionizable gas may be either nitrogen, hydrogen or oxygen and is preferably about one to ten per cent of the total volume of gaseous filling in the vessel. After the required pressure of gaseous filling has been attained in the vessel, it is sealed at the point 30.

Since the electrodes within the device contain no material which chemically combines with the gaseous filling, the proportions of the gaseous filling can be maintained substantially constant over a long period of time. Furthermore, the use of an enclosed cylindrical cathode materially reduces sputtering on the enclosing vessel so that the operating life of the discharge device is relatively long. The configuration of the anode and its accompanying perforated disc considerably reduces the effect of the negative charge on the glass wall of the vessel, so that arcing is considerably reduced during operation. In order to concentrate intense light on a film or other recording strip used for speech reproduction, it is necessary that the light be projected in a direct line onto the film. This is accomplished in accordance with this invention by the assembly of the electrodes on a common axis and locating the constricted intense column of light as close as possible to the end of the enclosing vessel which may be placed adjacent the film strip.

Figure 2:
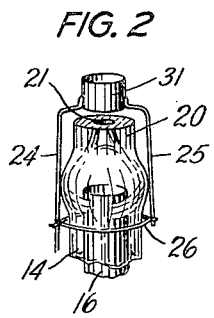
Fig. 2 is a view of a section of the interior assembly of Fig. 1 with a modified external electrode.
Figure 3:
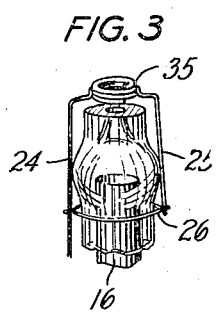
Fig. 3 shows another modification of the external electrode in the form of a wire helix.
Figure 4:
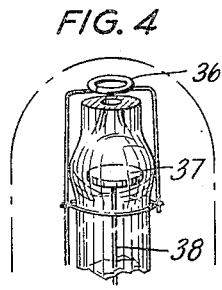
Fig. 4 is a sectional view showing an internal disc electrode and an external ring electrode.

While the anode assembly of Fig. 1 is designed to eliminate as much as possible the effect of the negative charge on the end of the enclosing vessel, a similar result may be accomplished by forming the anode as shown in Figs. 2 and 3 in which the cylinder 31 in Fig. 2 is attached to the lead wires 24 and 25 surrounding the inner chamber 14. In Fig. 3 a closed wire helix of several turns is supported adjacent the constricted column in the inner vessel 14 to form a hollow anode which is supported by the wires 24 and 25 in cooperative relation with the cylindrical cathode 16. Fig. 4 represents an assembly of electrodes cooperating with a constricted column in the inner vessel in which a ring-shaped anode 36 is supported by the inner vessel and a disc electrode 37 acts as the cathode within the cathode chamber and is supported by the lead wire 38. It is to be understood that any of the various forms shown in Figs. 2, 3 and 4 may be assembled in a manner shown in Fig. 1 and that the various configurations of the electrodes are interchangeable.

Figure 5:
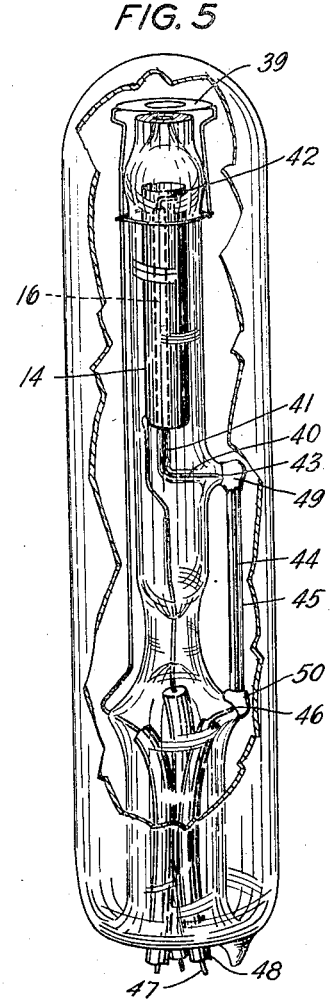
Fig. 5 shows an assembly of another form of the invention in which the external electrode is a disc and an auxiliary electrode is supported within the internal electrode.

Referring to Fig. 5 the general structure of the enclosing vessel and inner chamber is similar to the device described in connection with Fig. 1 except that the perforated disc 39 similar to the disc 23 in Fig. 1 acts as an anode in conjunction with the cylindrical cathode 16 within the chamber 14. When the anode is in the form of a hollow cylinder as shown in Figs. 1, 2 and 3, there is less tendency for the negative charge on the glass vessel 12 to interfere with the field intensity and therefore a discharge can be initiated between the cathode and anode at a relatively low potential. However, when the anode is in the form of a wire ring or disc or other form having negligible shielding effect, it has been found that an initiating discharge is more desirable than to create the main discharge by applying higher potentials. This is accomplished as shown in Fig. 5 by the use of an auxiliary electrode or anode 40 in the form of a wire extending through the cylindrical cathode 16 and provided with an insulating coating 41 preferably of glass. This electrode extends substantially the full length of the cathode and its free end is bent at right angles as shown at 42 to diminish the intervening space between the point of the auxiliary anode and the cylindrical cathode. The auxiliary electrode as shown is sealed through the inner chamber at 43 and an extension wire 44 surrounded by a glass tubing 45 projects downwardly to the stem where it is sealed at 46. A leading-in extension 47 projecting from the stem carries an insulating tubing 48 to prevent contact with the other leading-in wires. The joints at the sealing points 43 and 46 are preferably coated with insulating cement as shown at 49 and 50. The purpose of coating the auxiliary electrode throughout its length with insulating material is to prevent the formation of arcs between the auxiliary electrode and the other electrodes within the device.

Other means for creating the initial discharge between the auxiliary electrode and the cathode are shown in Figs. 6 and 7. In Fig. 6 the auxiliary electrode 51 is formed into a small diameter helix adjacent the lower end of the cylindrical cathode. In Fig. 7 the cylindrical cathode is tapered at the lower end to form a small diameter opening and a wire anode 53 extending through the small diameter opening of the cathode readily initiates the auxiliary discharge between the electrodes.

In the glow discharge devices previously described in accordance with this invention, the concentrated source of light is confined in a short column at the end of the inner enclosing vessel and projects a beam of circular formation toward the end of the enclosing vessel. In Fig. 8 a different form of the invention is illustrated in which the inner vessel enclosing the cathode has its free end collapsed on parallel sides of the vessel to form a narrow slit 54 to concentrate the light toward the end of the enclosing vessel, shown in outline, in the form of a ribbon, so that the ribbon of light may impinge on a film or other recording strip. In this form of the invention the anode 55 comprises several turns of wire formed into a helix having a contour conforming to the narrow slit formed by the collapsed end of the inner enclosing vessel. The wire anode 55 is supported adjacent the slit 54 by supporting wires 56 and 57 in a manner similar to that described in connection with the other figures. An auxiliary electrode 58 surrounded by insulating material 59 is coaxally arranged with respect to the cylindrical cathode within the inner chamber. In this form of the invention the leading-in wire 60 of the auxiliary electrode need not be coated with insulating material exterior to the inner enclosing vessel, since it has been found with the hollow form of anode, there is less tendency for arcing to occur between the leading-in wire 60 and the anode.

In Fig. 9 the shape of the constricted column is similar to that described in Fig. 8 except that it is slightly longer in length and the plate anode 62 in the form of a closed loop encircles the collapsed end of the inner vessel and is held thereon by friction. The leading-in wire 63 attached to the anode 62 extends along the length of the inner vessel and is sealed therein in a manner described in connection with Fig. 1. In this arrangement the plate anode 62 has an additional function in that the inner surface of the metallic electrode may be highly polished to form a reflecting surface to direct the discharge in a ribbon beam toward the end of the enclosing vessel shown in outline.

Fig. 10 represents another form of the invention similar in principle of operation to the other devices described above, but differing therefrom in the arrangement of the positive column of glow discharge and the shape of the external electrode. In this arrangement the inner cathode vessel 64 has its free end 65 bent at right angles to the vessel 64 and a constricted portion 65 formed to provide the short positive column 66 arranged at right angles to the axis of the enclosed cathode. A plate electrode 67 is supported adjacent the central opening of the constricted column by the leading-in wire 68 and the supporting stay wire 69. In this arrangement the source of light is viewed side-on in contra-distinction to the other forms of the invention in which the source of light is viewed end-on.

While the invention has been disclosed in a variety of ways to illustrate various features which may be interchangeable in all of the devices, it is to be understood that various other modifications may be made in the structural arrangement of the elements without departing from the scope of the invention as defined in the appended claims.

What is claimed is:

1. A gaseous glow discharge device comprising an enclosing vessel, an inner vessel therein, a cylindrical cold cathode in contact with the surface of said inner vessel, and a cylindrical anode exterior to said inner vessel, said inner vessel having a capillary tube portion intermediate said electrodes.

2. A gaseous glow discharge device comprising an enclosing vessel having a stem, a tubular insulating member supported by said stem and having a constricted opening of a cross-sectional area less than the thickness of the wall of said member, an electrode enclosed by said tubular member, and an annular electrode external to said member adjacent the opening therein.

3. A gaseous glow discharge device comprising an enclosed vessel having a stem, a tubular insulating member supported by said stem and having an opening of small cross-sectional area, a cylindrical cathode enclosed by said tubular member, a tubular anode external to said member and arranged above the opening therein and an auxiliary electrode coaxial with said cylindrical cathode.

4. A glow discharge device comprising an outer envelope containing a gaseous atmosphere, an inner envelope having one end open to said gaseous atmosphere, an electrode within said inner envelope having its inner surface in contact with said gaseous atmosphere and its outer surface in contact with said inner vessel, and another electrode outside said inner envelope and closely adjacent to the opening therein.

5. A glow discharge device comprising an enclosing vessel having a filling of mixed monatomic and diatomic gases, a tubular insulating member extending within said enclosing vessel, a cylindrical electrode within said member, a leading-in wire supporting said electrode, a cylindrical electrode having a flanged disc portion adjacent the free end of said tubular member, and a leading-in wire extending along the outside of said tubular member and attached to said disc portion, said tubular member having a constricted portion located between said electrodes.

6. A gaseous glow discharge device comprising an enclosing vessel having a filling of mixed monatomic and diatomic gases, a tubular insulating member extending within said enclosing vessel, a cylindrical electrode within said member, an electrode supported external to said member, said member having a constricted portion located between said electrodes, and auxiliary anode extending within said cylindrical electrode, and a close-fitting insulator substantially enclosing said auxiliary anode throughout its length.

7. A gaseous glow discharge device comprising an enclosing vessel having a filling of mixed monatomic and diatomic gases, a tubular insulating member extending within said enclosing vessel, a cylindrical electrode within said member, another electrode external to said member, said member having a constricted portion located intermediate both of said electrodes, and an auxiliary anode extending within said cylindrical electrode, said auxiliary anode being bent at right angles near its free end and closely spaced from said cylindrical electrode, whereby the auxiliary discharge between said electrodes is initiated at a low potential.

8. A gaseous glow discharge device comprising an enclosing vessel having a filling of mixed monatomic and diatomic gases, a tubular insulating member extending within said enclosing vessel, said member having a partially collapsed portion to form an elongated slit, an electrode supported within said member, and another electrode supported above said slit and having a contour approximately the same as said slit.

9. A gaseous glow discharge device comprising an enclosing vessel, a tubular insulating member extending within said enclosing vessel, a cylindrical electrode within said member, said member having a partially collapsed portion to form an elongated slit near its free end, and a metallic plate electrode surrounding said collapsed portion.

10. A gaseous glow discharge device comprising an enclosing vessel, a tubular insulating member within said enclosing vessel, a cylindrical electrode supported within said member, said member having a partially collapsed portion to form a constricted opening in the free end thereof, a plate electrode frictionally supported by said collapsed portion, and a leading-in wire attached to said electrode and extending from said enclosing vessel.

11. A gaseous glow discharge device comprising an enclosing vessel having a stem, a tubular insulating member supported by said stem, a cylindrical electrode within said member, said member having a partially collapsed portion to form a constricted column of small area in the free end thereof, and a helical electrode supported above said member and having a contour approximately the same as said constricted opening.

12. A gaseous glow discharge device comprising an enclosing vessel having a stem, a tubular insulating member supported by said stem, a cylindrical cold cathode enclosed in said member, said member having a partially collapsed portion to form a short constricted column, and an external anode supported adjacent said constricted column, said anode having its inner surface polished to act as a reflector for the discharge.

13. A gaseous glow discharge device comprising an enclosing vessel having a stem, a tubular insulating member supported from said stem, a cylindrical cold cathode enclosed in said member, said cathode having one end tapered to a small diameter, an anode, and an auxiliary electrode closely adjacent said tapered end of said cathode.

14. A gaseous glow discharge device comprising an enclosing vessel having a stem, a tubular insulating member extending from said stem, an electrode supported within said member, said tubular member having its free end bent at right angles to the axis of said cathode and having a constricted opening therein, and an anode adjacent said free end.

15. A gaseous glow discharge device comprising an enclosing vessel containing two cooperating metallic cold electrodes, one of said electrodes being hollow and having an opening therein towards said other electrodes and the other of said electrodes having an opening aligned with the opening of said first electrode, a gaseous filling in said device, and an inner chamber segregating one of said electrodes from the other, said chamber having intermediate said electrodes a capillary tube portion the cross-sectional area of the opening of which is small compared with said opening in said first mentioned electrode, whereby a highly intensive glow discharge is concentrated in said capillary tube portion during operation.

In witness whereof, I hereunto subscribe my name this 23rd day of March, 1929.

JOHN B. JOHNSON.